(12) United States Patent
Andrus et al.

(10) Patent No.: US 9,021,008 B1
(45) Date of Patent: Apr. 28, 2015

(54) MANAGING TARGETED SCRIPTS

(75) Inventors: Kolton D. Andrus, Seattle, WA (US);
Daniel M. Vogel, Seattle, WA (US);
Timothy M. Sehn, Seattle, WA (US);
Aaron D. Son, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 324 days.

(21) Appl. No.: 13/216,957

(22) Filed: Aug. 24, 2011

(51) Int. Cl.
*G06F 15/16* (2006.01)
*G06F 15/177* (2006.01)
*G06F 9/45* (2006.01)
*G06F 11/36* (2006.01)
*H04L 12/26* (2006.01)

(52) U.S. Cl.
CPC ............ G06F 11/3668 (2013.01); *H04L 12/26* (2013.01); *G06F 11/3672* (2013.01)

(58) Field of Classification Search
CPC ............ G06F 11/3672; G06F 11/3668; G06F 11/3676
USPC ......... 717/173, 115, 167, 177, 124, 134, 135; 709/223, 224
See application file for complete search history.

(56) References Cited

U.S. PATENT DOCUMENTS

| | | | |
|---|---|---|---|
| 6,347,094 B1* | 2/2002 | Gopalakrishnan | 370/464 |
| 7,657,789 B1* | 2/2010 | Gerber et al. | 714/25 |
| 2003/0121032 A1* | 6/2003 | Cho et al. | 717/173 |
| 2004/0015846 A1* | 1/2004 | Haisraeli | 717/115 |
| 2004/0032837 A1* | 2/2004 | Visser | 370/254 |
| 2005/0022194 A1* | 1/2005 | Weir et al. | 718/100 |
| 2005/0125188 A1* | 6/2005 | Eden et al. | 702/121 |
| 2006/0156287 A1* | 7/2006 | Vikram | 717/124 |
| 2006/0184842 A1* | 8/2006 | Boucher | 714/55 |
| 2006/0259629 A1* | 11/2006 | Usmani et al. | 709/227 |
| 2007/0055766 A1* | 3/2007 | Petropoulakis et al. | 709/224 |
| 2007/0214028 A1* | 9/2007 | Stich et al. | 705/8 |
| 2008/0109790 A1* | 5/2008 | Farnham et al. | 717/128 |

* cited by examiner

*Primary Examiner* — Aftab Nasir Khan
(74) *Attorney, Agent, or Firm* — Knobbe, Martens, Olson & Bear, LLP

(57) ABSTRACT

Systems and methods are disclosed that facilitate the evaluation of the operation of host computing devices by utilization of targeted scripts. Each host computing device includes a local targeted script management component that interfaces with a centralized or master targeted script management component. The local targeted script management component obtains targeted scripts, causes the execution of the targeted script and can terminate the targeted script. Additionally, the local targeted script management component can collect information associated with the execution of the targeted scripts and initiate the restoration of previous state in the event that the execution of the targeted script modifies or otherwise affects the host computing device.

29 Claims, 6 Drawing Sheets

MANAGING TARGETED SCRIPTS

BACKGROUND

Generally described, computing devices utilize a communication network, or a series of communication networks, to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies may allow a single physical computing device to host one or more instances of virtual machines that appear and operate as independent computing devices to users of a data center. With virtualization, the single physical computing device can create, maintain, delete, or otherwise manage virtual machines in a dynamic matter. In turn, users can request computer resources from a data center, including single computing devices or a configuration of networked computing devices, and be provided with varying numbers of virtual machine resources.

In some scenarios, instances of a virtual machine or a physical computing device may be configured to provide specific functionality. For example, various computing devices may be associated with different combinations of operating systems or operating system configurations, virtualized hardware resources and software applications to enable a computing device to provide different desired functionalities, or to provide similar functionalities more efficiently. In some scenarios, the configured computing device or configured virtual machine instances may not conform to a set of best practices and may be vulnerable to malware, root kits, viruses, or other types of malicious code or may function in an unexpected manner in specific scenarios.

BRIEF DESCRIPTION OF THE DRAWINGS

The foregoing aspects and many of the attendant advantages will become more readily appreciated by reference to the following detailed description, when taken in conjunction with the accompanying drawings, wherein.

DETAILED DESCRIPTION

Generally described, aspects of the present disclosure relate to the management of hosted computing devices. Specifically, systems and methods are disclosed that facilitate the evaluation of the operation of host computing devices by utilization of targeted scripts. Illustratively, the targeted scripts, or other executable code, are configured in a way to simulate specific actions on the host computing device (e.g., errors associated with memory usage), actions on the communication network (e.g., errors associated with dropped packets), and actions associated with other network components (e.g., a malicious attack from another component). In one embodiment, each host computing device includes a local targeted script management component that interfaces with a centralized or master targeted script management component. The local targeted script management component obtains targeted scripts, causes the execution of the targeted script and can terminate the targeted script. Additionally, the local targeted script management component can collect information associated with the execution of the targeted scripts and initiate the restoration of previous state (e.g., a roll back) in the event that the execution of the targeted script modifies or otherwise affects the host computing device.

Figure 1:
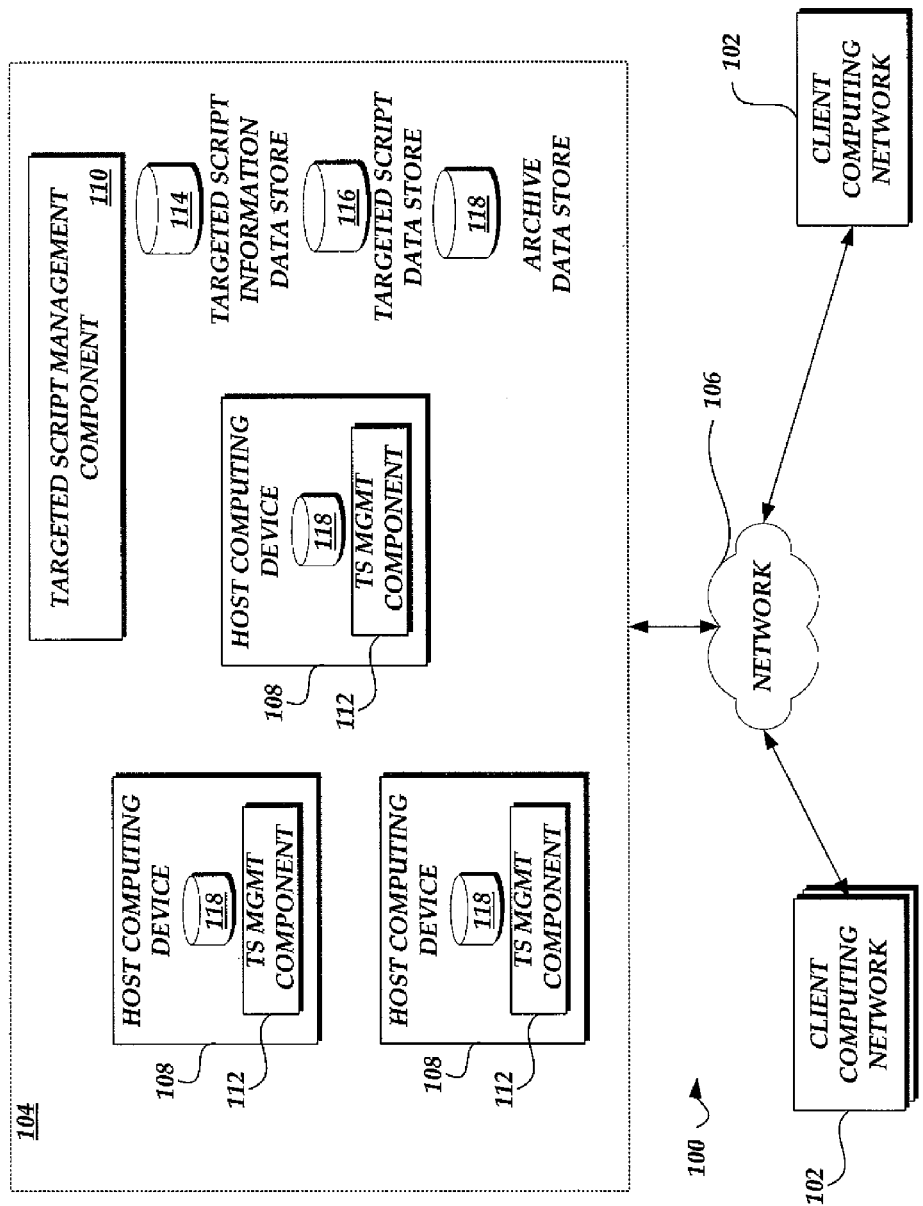
FIG. 1 is a block diagram depicting an illustrative of a virtual network environment for managing virtual machine instance types including a number of computing device networks, a number of host computing devices, and a targeted script management component.

FIG. 1 is a block diagram illustrating an embodiment of a virtual network environment 100. The virtual network environment 100 includes one or more client computing device networks 102 in communication with a virtual network 104 via a communication network. In one embodiment, the client computing device networks 102 can correspond to one or more computing devices that are controlled on or behalf of a user (such as a system administrator). The communication network 106 may be, for instance, a wide area network (WAN), a local area network (LAN), or a global communications network.

The virtual network 104 can include multiple physical computing devices, generally referred to as host computing devices 108. In one embodiment, the host computing devices 108 are capable of hosting multiple virtual machine instances. At least some of the virtual machine instances may be provisioned to provide a variety of different desired functionalities depending on the needs of the data center. Examples of the types of desired functionality, include but are not limited to: database management, serving or distributing data or content (e.g., Web servers), managing load balancing or network resources, managing network connectivity or security, providing network addressing information, managing client or server redirection, or any other functionality associated with a data center. One skilled in the relevant art will appreciate that the virtual network 104 is logical in nature and can encompass host computing devices 108 from various geographic regions. Additionally, although the host computing devices 108 will be discussed with regard to hosted virtual machine instances, one or more of the host computing devices 108 may be physical machines configured to provide.

The virtual network 104 also includes a targeted script management component 110 for processing requests for evaluation of machine images on virtual machine instances. As will be explained in greater detail below with regard to FIGS. 3A and 3B, the targeted script management component 110 can select appropriate code, such as targeted scripts or other executable code, that can simulate specific actions on the host computing devices 108. It should be appreciated that, although the targeted script management component 110 is depicted for the purpose of example as a single, stand alone logical component in illustrative FIG. 1, the routines and steps performed by the targeted script management component 110 may be distributed among any number of components and executed in hardware or software. For example, multiple targeted script management components 110 may be implemented in the virtual network 104. Additionally, although the targeted script management component 110 is illustrated as logically associated within the virtual network 104, the targeted script management component 110 may be implemented in a separate networked environment, in conjunction with client computing device networks 102, or otherwise integrated into other components/systems of the virtual network 104.

In addition to the targeted script management component 110, each host computing device 108 includes a local targeted script management component 112. In one aspect, the local targeted script management component 112 interfaces with the targeted script management component 110 to obtain targeted scripts. In another aspect, the local targeted script management component 112 causes the execution of targeted scripts and can observe the behavior of the host computing device 108 relative to the executed targeted script. Additionally, the local targeted script management component 112 can generate log information related to the execution of the targeted script. Additionally, the local targeted script management component 112 can facilitate the termination of an executing targeted script and can initiate procedures for reverting back to a previous state or configuration in the event the executed targeted script modifies the operation or configuration of the host computing device 108.

With continued reference to FIG. 1, the virtual network 104 can further include a targeted script information data store 114 for maintaining, at least in part, information related to the execution of targeted scripts by host computing devices 108. The virtual network 104 can also include a targeted script data store 116 for maintaining, at least in part, executable code, such as scripts, utilized by the local targeted script management component 112. The virtual network 104 can further include an archive data store 118 for maintaining, at least in part, information utilized to restore a previous state or configuration of host computing devices. As illustrated in FIG. 1, each local targeted script management component 112 can also include at least a portion of the archive data store 118 for utilization in restoring the state or configuration of a specific host computing device 108. Illustratively, the targeted script information data store 114, targeted script data store 116 and the archive data store 118 may correspond to network attached storage (NAS), database servers, local storage, or other storage configurations which may be implemented in a centralized or distributed manner. Additionally, although the targeted script information data store 114, targeted script data store 116 and the archive data store 118 are illustrated as separate data stores, one skilled in the relevant art will appreciate that one or more of the data stores may be combined or implemented as a common data store.

Figure 2:
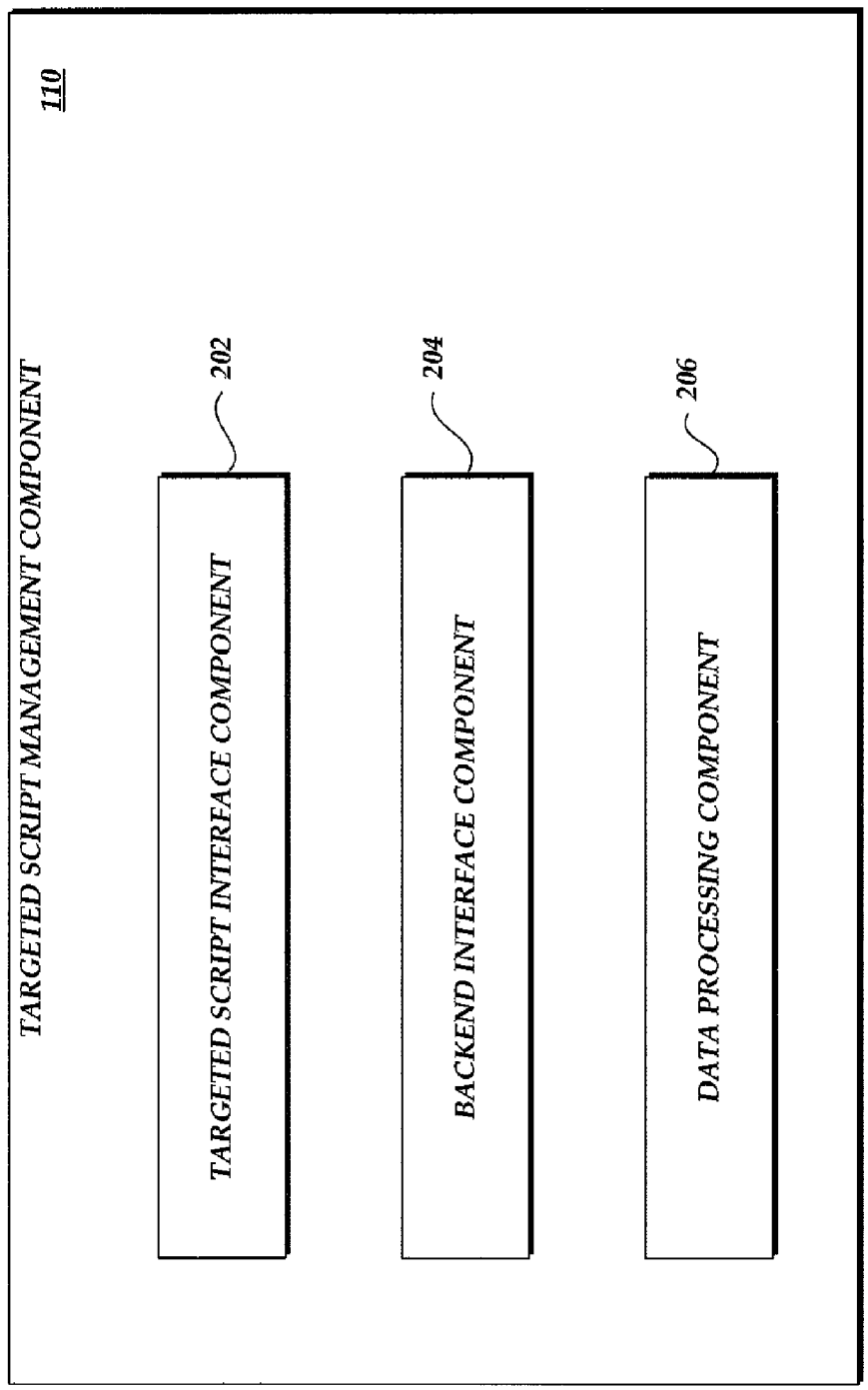
FIG. 2 is a block diagram illustrating a subset of components of a targeted script management component for utilization in the virtual network environment of FIG. 1.

FIG. 2 illustrates selected modules or components in a representative targeted script management component 110. Illustratively, the targeted script management component 110 may be associated with have computing resources such as central processing units and architectures, memory, mass storage, graphics processing units, communication network availability and bandwidth, etc. Generally, however, the targeted script management component 110 may include one or more processing units, such as one or more CPUs. The targeted script management component 110 may also include system memory, which may correspond to any combination of volatile and/or non-volatile storage mechanisms. The system memory may store information that provides an operating system component, various program modules, program data, or other components. The targeted script management component 110 performs functions by using the processing unit(s) to execute instructions provided by the system memory. The targeted script management component 110 may also include one or more types of removable storage and one or more types of non-removable storage. Still further, the targeted script management component 110 can include communication components for facilitating communication via wired and wireless communication networks, such as communication network 106.

As illustrated in FIG. 2, the targeted script management component 110 can include, among other hardware or software components, a targeted script interface component 202 for facilitating the generation of targeted scripts and transmission to one or more local targeted script management components 112. The targeted script management component 110 can also include a backend interface component 204 for processing and storing information provided by local targeted script management components 112 related to the execution of targeted scripts on the host computing devices 108. The targeted script management component 110 can further include a data processing component 206 for the selection of one or more targeted scripts from the targeted scripts data store 116. One skilled in the relevant art will appreciate that the illustrated components 202, 204, 206 may be implemented as stand along components or modules. Additionally, one or more of the modules 202, 204, 206 may be implemented into other components or otherwise combined.

Figure 3A:
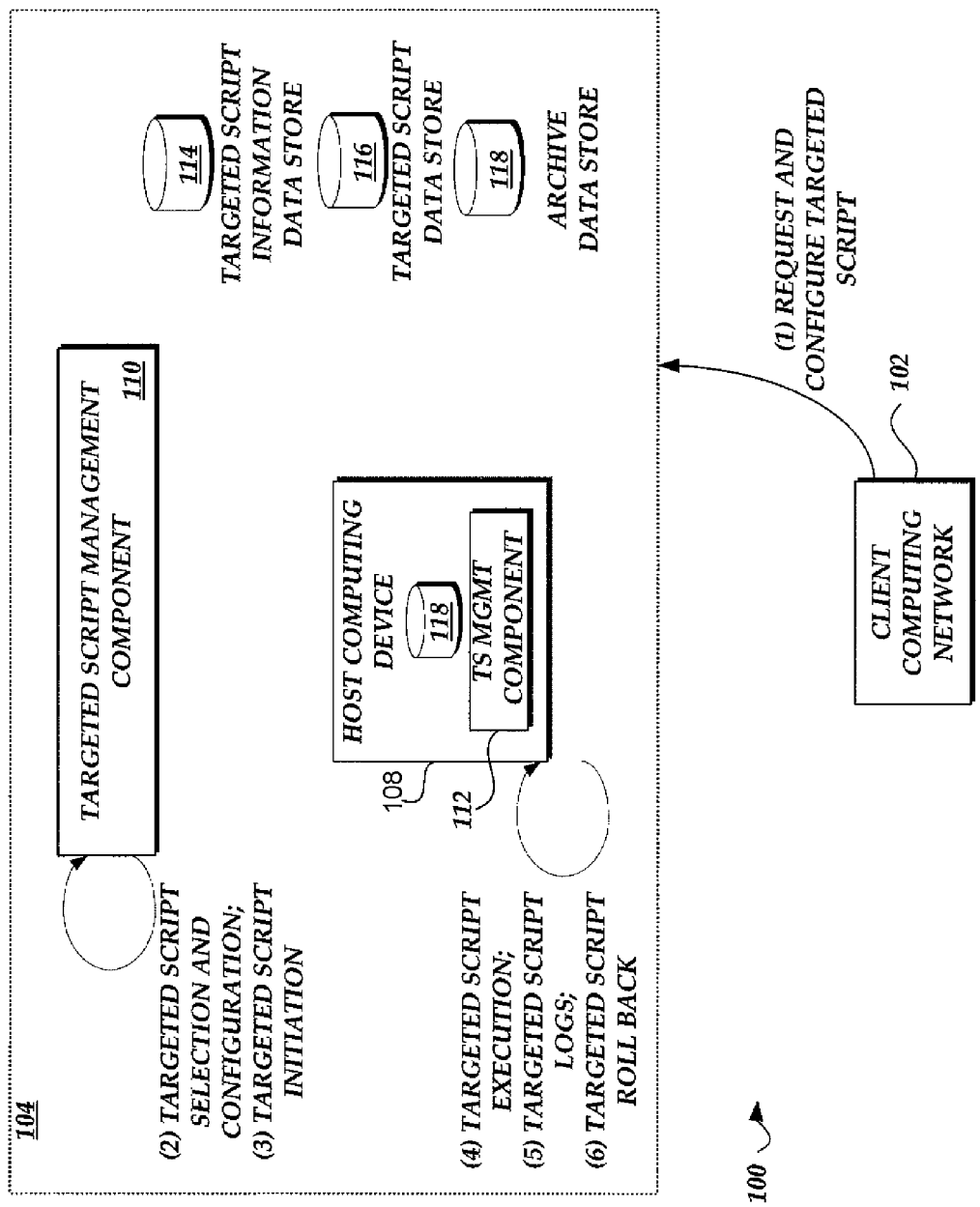
FIGS. 3A and 3B are simplified block diagrams of the virtual network environment of FIG. 1 illustrating the selection and execution of targeted scripts on one or more host computing devices.
Figure 3B:
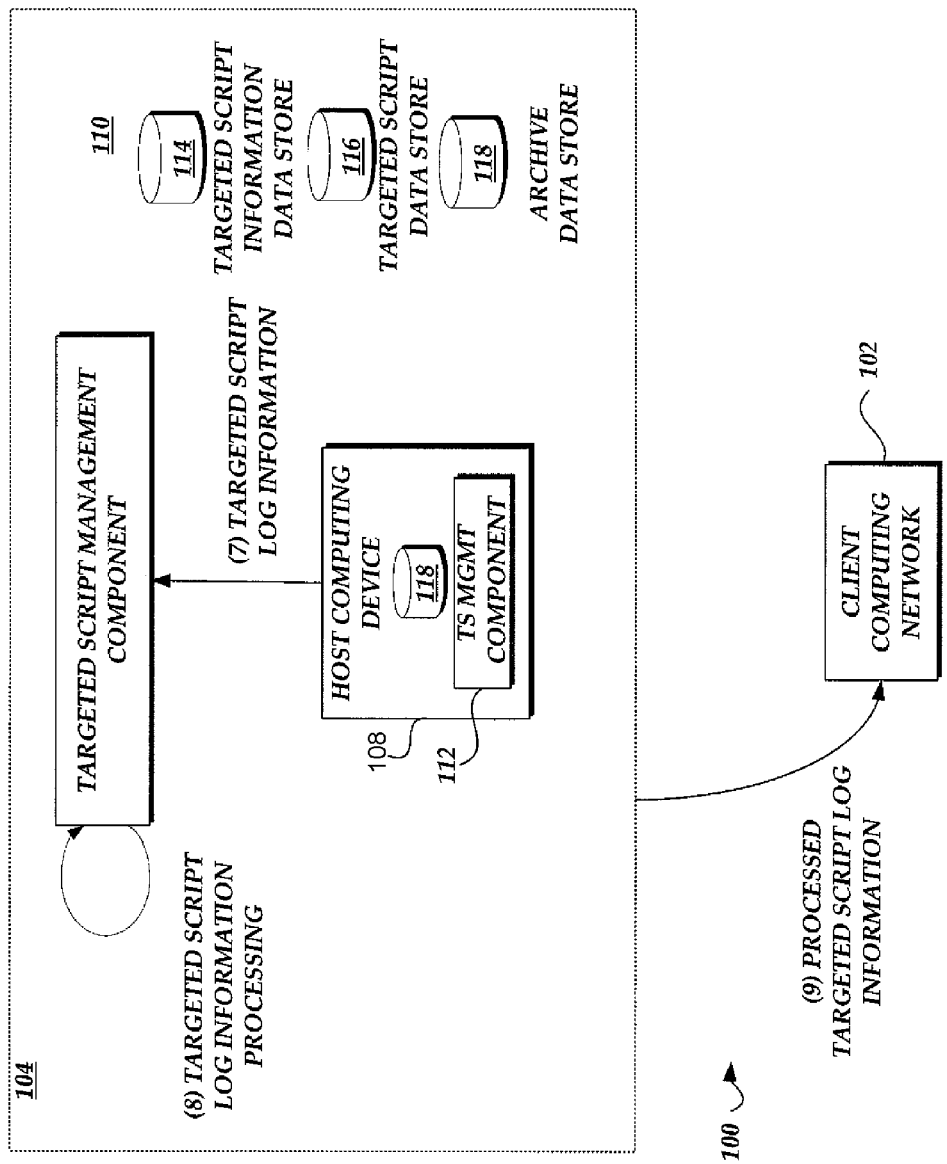

Turning now to FIGS. 3A and 3B, a simplified block diagram of the virtual network environment 100 of FIG. 1 illustrating the selection and execution of targeted scripts on one or more host computing devices 108 will be described. For purposes of illustration, many of the components of the virtual network environment 100 have been omitted. However, one skilled in the relevant art will appreciate that the illustrated interaction between components may utilize the omitted components or additional components not previously illustrated in FIG. 1.

With reference to FIG. 3A, in one embodiment, the client computing network 102 can initiate a request to the targeted script management component 110 to authorize or request the initiation of targeted scripts on one or more hosted computing devices 108 associated with the client computing device network 102. The request can identify a specific targeted script or class of targeted script (e.g., specify a type of attack). The request can also identify a type of testing (e.g., network security) without specification of specific targeted scripts or types of scripts. Based on the received request, the targeted script management component 110 selects one or more targeted scripts and makes any additional configurations to the targeted scripts (as appropriate). At some point, the targeted script management component 110 then initiates the execution of the selected targeted scripts on the identified host computing devices 108. Illustratively, the targeted script management component 110 can control the timing of the initiation of the execution of the targeted scripts so as to mitigate the effect of the host computing device 108 from being configured or optimized to execute the targeted script if the timing of the execution of the targeted script was known (e.g., mitigate the potential that the host computing device 108 would enter a "safe" mode with knowledge of an impending targeted script).

With reference now to FIG. 3B, upon the execution of the targeted script, the local targeted script management component 112 can transmit collected information to the targeted script management component 110. For example, the local targeted script management component 112 can transmit log files indicative of the result of the various targeted scripts that were executed by the host computing device 108. Additionally, the local targeted script management component 112 can identify any error conditions or other notifications that resulted from the execution of the targeted script. The transmission of the log files, notifications or other information may occur contemporaneously with the execution the targeted scripts or upon the completion of the execution of the targeted scripts. The targeted script management component 110 can then process any of the received information, such as by incorporating historical information, standardizing the information or combining information from the execution of other targeted scripts. At least some portion of the processed information or a summary of the processed information may be provided to the requesting client computing network 102 (or other component).

Figure 4:
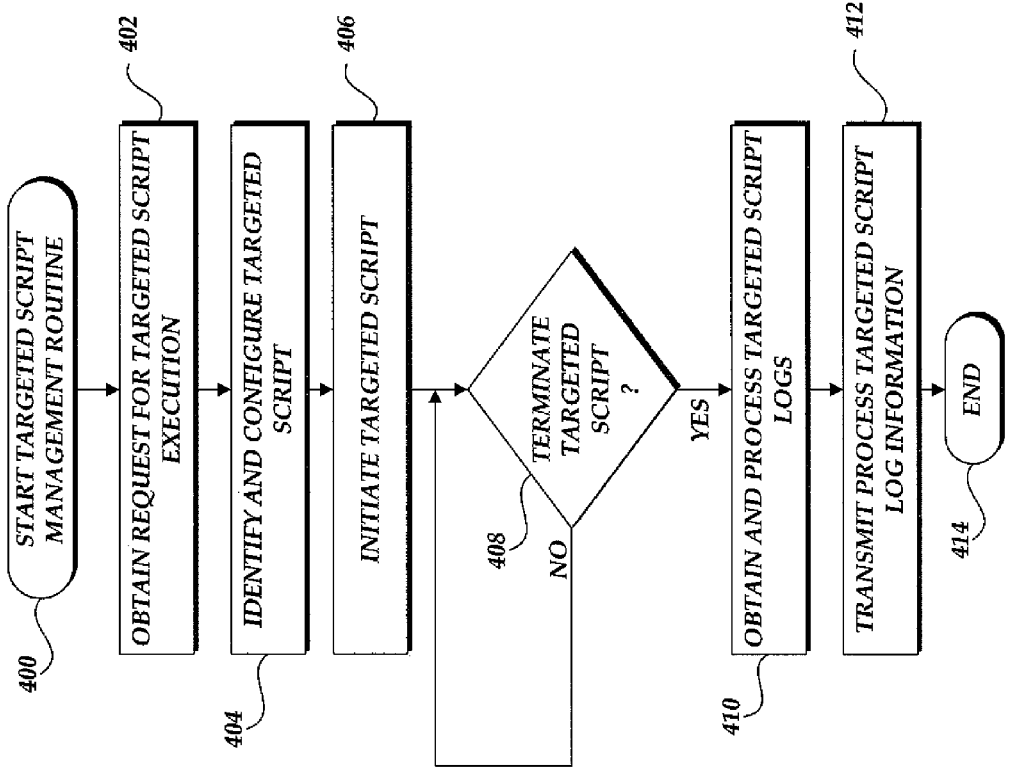
FIG. 4 is a flow diagram illustrative of a targeted script management routine implemented by a targeted script management component.

Turning to FIG. 4, a flow diagram illustrative of a targeted script management routine 400 implemented by the targeted script management component 110 will be described. While routine 400 will be described with regard to implementation by the targeted script management component 110, one skilled in the relevant art will appreciate that routine 400 may be implemented by the local targeted script management component 112 or other component of the virtual network 104.

At block 402, the targeted script management component 110 obtains a request for targeted script execution. In one embodiment, the request can be transmitted by a client computing network 102. As previously described, the request can identify a specific targeted script or class of targeted script (e.g., specify a type of attack) to be applied to one or more identified host computing devices 108. The request can also identify a type of testing (e.g., network security) without specification of specific targeted scripts or types of scripts. In another embodiment, a request can be determined based on evaluation of criteria, such as aspects or performance of the host computing devices 108. For example, for a host computing device 108 designated as critical, the targeted script management component 110 can infer a request for one or more targeted scripts.

At block 404, the targeted script management component 110 identifies and configures one or more targeted scripts. Illustratively, the configuration of the targeted script can correspond to the inclusion of information or configuration of the executable code that facilitates its execution on a specific host computing device 108 or set of host computing devices. For example, if one of the targeted scripts corresponds to the exclusion of data packets from an identified source, the targeted script management component 110 can configure the targeted script with the identification of the identified source. At block 406, the targeted script management component 110 initiates the targeted script. As previously described, in an illustrative embodiment, the targeted script management component 110 controls the execution of the targeted scripts such that the client computing network 102 or host computing devices 108 are not aware of the timing of the execution of the selected targeted scripts.

At decision block 408, the routine 400 enters into a loop in which the local targeted script management component 112 causes the execution of the targeted script for an established time period (e.g., an execution period) or so long as no error or unwanted modification of the host computing device 108 occurs. In one embodiment, upon the completion of the allocated time window or in the event of an error or undesired modification of the host computing device 108, the targeted script is terminated by the local targeted script management component 112 and at block 410, the targeted script management component 110 obtains targeted script logs corresponding to information associated with the execution of the targeted script on the host computing device 108. In another embodiment, the targeted script management component 110 can continuously transmit targeted script logs or other processing information on a real time or semi-real time basis. The targeted script management component 110 can then process the targeted scrip log information. As previously described, the targeted script management component 110 can incorporate historical information related to the execution of the targeted script, standardize the log information or combine information from the execution of other targeted scripts. At block 412, the targeted script management component 110 can transmit at least some portion of the processed information or a summary of the processed information to the requesting client computing network 102 (or other component). At block 414, the routine 400 terminates.

Figure 5:
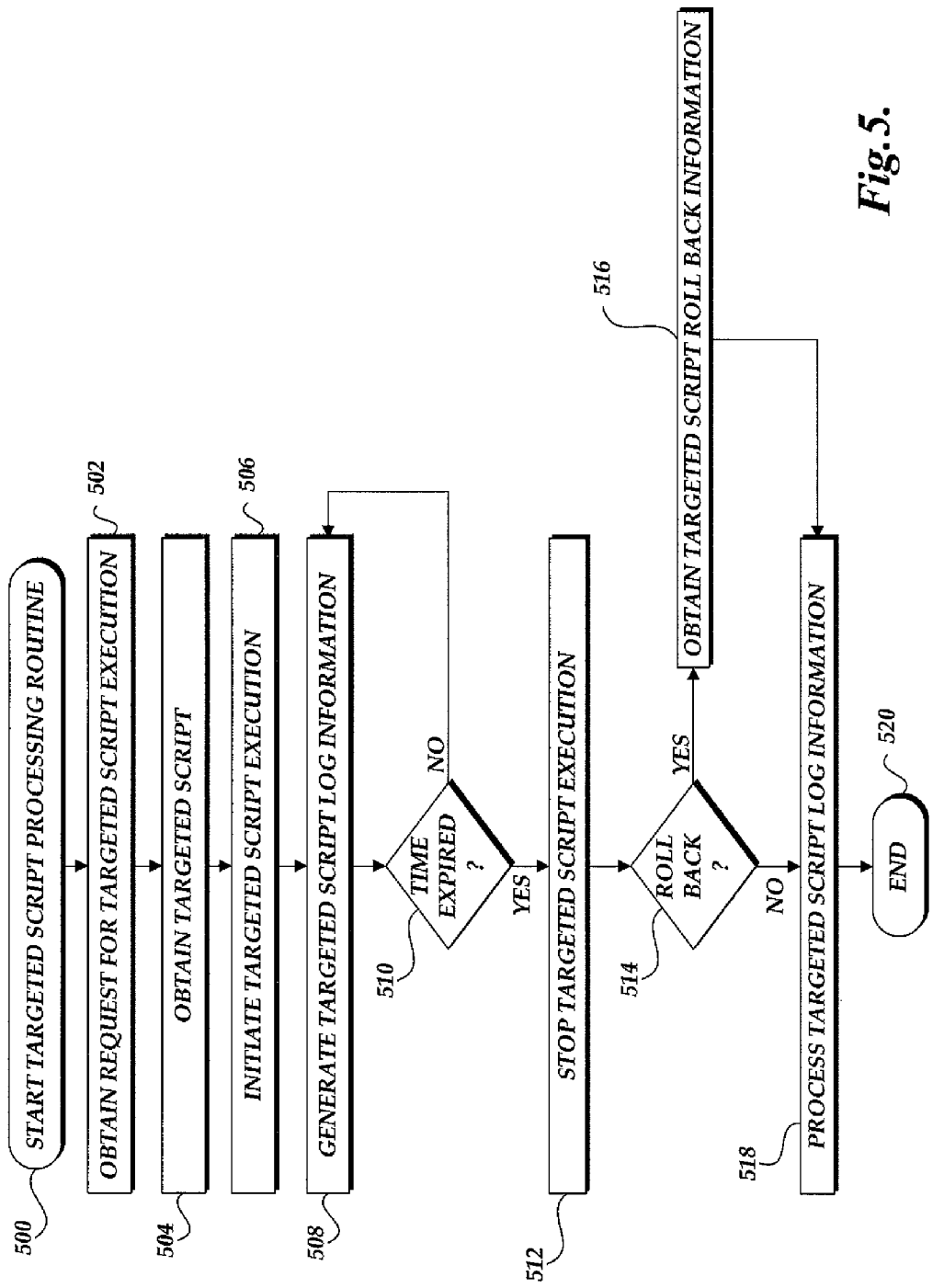
FIG. 5 is a flow diagram illustrative of a targeted script processing routine implemented by a targeted script management component.

Turning to FIG. 5, a flow diagram illustrative of a targeted script execution routine 500 implemented by the local targeted script management component 112 will be described. While routine 500 will be described with regard to implementation by the local targeted script management component 112, one skilled in the relevant art will appreciate that routine 500 may be implemented by the targeted script management component 110 or other component of the virtual network 104. At block 502, the local targeted script management component 112 obtains a request for targeted script execution and obtains the targeted script at block 504. Illustratively, the request for the execution of the targeted script execution and the targeted script can be transmitted from the targeted script management component 110, or on behalf of the targeted script management component 110.

At block 506, the local targeted script management component 112 initiates the execution of the received targeted script in accordance with any configuration information accompanying the targeted script or incorporated into the targeted script. At block 508, the local targeted script management component 112 begins generating targeted script log information. Illustratively, the targeted script log information can include various types of information related to the execution of the targeted script and potential effects related to the execution of the targeted script. At decision block 510, the local targeted script management component 112 determines whether a window of time for the execution of the targeted script has expired. If not, the routine 500 returns to block 508 for the continued execution of the targeted script and the collection of targeted script information.

With reference again to decision block 510, once the time period for executing the targeted script expires or in the event that the execution of the targeted script generates an error or creates modifications to the host computing device 108, at block 512, the local targeted script management component 112 terminates the targeted script execution. At decision block 514, a test is conducted to determine whether the host computing device 108 requires a roll back to a previous state of information. In one embodiment, the local targeted script management component 112 can maintain (or cause to be maintained) information that facilitates the reversion to previous states or configurations prior to the execution of the targeted script. In some scenarios, in the event the execution of the targeted script does not create any type of error or modification, the local targeted script management component 112 does not need to initiate a reversion. In this case, the routine 500 proceeds to block 518, described below. Alternatively, if execution of the targeted script requires a reversion to a previous state, at block 516, the local targeted script management component 112 obtains or recalls targeted script roll back information for attempting to revert to a previous state or configuration. One skilled in the relevant art will appreciate that the local targeted script management component 112 can utilize various techniques or tools for obtaining and maintaining the previous state or configuration information and for causing the reversion to the maintained state or configuration information.

At block 518, the local targeted script management component 112 processes the targeted script information. For example, the local targeted script management component 112 can transmit log files indicative of the result of the various targeted scripts that were executed by the host computing device 108. In another example, the local targeted script management component 112 can obtain additional information from one or more components or external resources to include in the targeted script information. At block 520, the routine 500 terminates.

As previously described, in one embodiment, the targeted scripts, or other executable code, are configured in a way to simulate specific actions on the host computing device, actions on the communication network, and actions associated with other network components. The following correspond to a set of illustrative examples of the types of behavior or action that the targeted scripts are intending to elicit on a host computing device 108 or set of host computing device 108. However, the set of illustrative examples are not exhaustive of the specific implementation or types of targeted scripts.

By way of a first illustrative example, a first set of targeted scripts can correspond to executable code that causes the host computing device 108 to experience limitations to various types of computing resources or to restrict other processes. In this example, one or more targeted scripts can be utilized to limit central processing unit ("CPU") availability, memory allocation, disk space availability, or network availability. Additionally, one or more targeted scripts can be created or configured to introduction of latencies in the performance of various resources, such as the CPU, memory, disks, or network interface. For example, a targeted script can be utilized to prevent a host computing device from being able to write data to memory (or emulate such action). Further, one or more targeted scripts can be created or configured to generate large files on the host computing devices 108, create additional process requests for computing resources or to cause the termination of identified processes being executed on the host computing devices 108. Still further, one or more targeted scripts can be created or configured to cause various components to reset or be reconfigured, such as causing a host computing device to reboot. In another example, a targeted script can cause hardware components to enter into an alternative mode, such as a low power mode in which the utilization of the resource may be more limited.

In a second illustrative example, a second set of targeted scripts can correspond to executable code that affects the interaction of the host computing device with other processes, such as network based services. In this example, one or more targeted scripts may be utilized or configured to prevent any type of data communication between the host computing device 108 and a set of identified services or components, generally referred to as a black hole. Additionally, one or more targeted scripts can be utilized or configured to determine a percentage of data traffic that is purposefully dropped between the host computing device 108 and a set of identified services or components. In another variation, one or more targeted scripts can be utilized or configured to determine a percentage of data traffic that is purposefully delayed between the host computing device 108 and a set of identified services or components.

In a third illustrative example, a third set of targeted scripts can correspond to executable code that affects the network connectivity associated with the host computing device 108. In this example, one or more targeted scripts may be utilized or configured that causes the host computing device 108 to lose connectivity to a hosted network (such as a hosted virtual network) or to components of the hosted network. The one or more targeted scripts may re-enable the hosted network connection. Additionally, one or more targeted scripts may be utilized or configured to causes network connections between the host computing device 108 and various external components to remain open. For example, a targeted script can be configured to facilitate the dropping of handshake packets that prevent the termination of communication requests between the host computing device 108 and other components.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art. It will further be appreciated that the data and/or components described above may be stored on a computer-readable medium and loaded into memory of the computing device using a drive mechanism associated with a computer readable storing the computer executable components such as a CD-ROM, DVD-ROM, or network interface further, the component and/or data can be included in a single device or distributed in any manner. Accordingly, general purpose computing devices may be configured to implement the processes, algorithms, and methodology of the present disclosure with the processing and/or execution of the various data and/or components described above.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A method for host computing devices, comprising:
obtaining, by a targeted script management component, a request for execution of targeted scripts configured to test an operation of computing devices on an identified set of host computing devices;
determining, by the targeted script management component, one or more targeted scripts responsive to the request, wherein the one or more targeted scripts are configured in accordance with the identified set of host computing devices and wherein the one or more targeted scripts are configured to simulate actions on the identified set of host computing devices enabling evaluation of the operation of the identified set of host computing devices;
accessing, by a local targeted script management component, the determined one or more targeted scripts from a targeted script data store;
storing, by the local targeted script management component, restoration information for the identified set of host computing devices enabling restoration of the identified set of host computing devices to a state prior to the execution of the determined one or more targeted scripts;
causing, by the targeted script management component, the execution of the determined one or more targeted scripts on the identified set of host computing devices, the execution of the determined one or more targeted scripts on the identified set of host computing devices controlled by the local targeted script management component;
determining, by the local targeted script management component, whether at least one of the identified set of host computing devices is to be restored to a state prior to the execution of the determined one or more targeted scripts based on a state of the at least one of the identified set of host computing devices after execution of the determined one or more targeted scripts;
restoring, by the local targeted script management component, the at least one of the identified set of host computing devices to a prior state using the restoration information in response to determining that the at least one of the identified set of host computing devices is to be restored to the state prior to the execution of the determined one or more targeted scripts without receiving a command from a user to restore the at least one of the identified set of host computing devices;
obtaining, by the targeted script management component, targeted script information related to the execution of the one or more determined targeted scripts on the identified set of host computing devices from the local targeted script management component, the targeted script information comprising log information collected by the local targeted script management component during execution of the one or more targeted scripts;
processing, by the targeted script management component, the obtained targeted script information; and
transmitting, by the targeted script management component, at least a portion of the processed targeted script information,
wherein at least one of the determined one or more targeted scripts is configured to elicit: a deletion of at least a percentage of data packets between the identified set of host computing devices and one or more network components, a modification of communication channels between the identified set of host computing devices and the one or more network components, and a reboot of the identified set of host computing devices and the one or more network components, and
wherein the targeted script management component is implemented by one or more computer processors.

2. The method as recited in claim 1, wherein the determined one or more targeted scripts include executable code configured to cause at least one of a simulation of specific actions on a host computing device from the identified set of host computing devices, a simulation of actions on a communication network, and a simulation of actions associated with other network components.

3. The method as recited in claim 1, wherein obtaining targeted script information includes obtaining information identifying errors generated on a host computing device from the identified set of host computing devices.

4. The method as recited in claim 1, wherein obtaining targeted script information includes obtaining information identifying a modification of data on a host computing device from the identified set of host computing devices.

5. The method as recited in claim 1, wherein processing the targeted script information includes combining the obtained targeted script information with additional information.

6. The method as recited in claim 1, further comprising:
simulating actions on the identified set of host computing devices by execution of the one or more targeted scripts; and
evaluating operation of the identified set of host computing devices based at least partially on the simulated actions.

7. The method as recited in claim 1, further comprising restoring the identified set of host computing devices to a state prior to the execution of the one or more targeted scripts based at least partially on the restoration information.

8. A method for host computing devices, comprising:
obtaining a request for execution of executable code on an identified set of host computing devices to test an operation of the identified set of host computing devices, the executable code configured to simulate operations on the identified set of host computing devices enabling evaluation of the identified set of host computing devices and configured to elicit actions on the set of host computing devices over a defined execution period;
determining executable code responsive to the request causing a local targeted script management component to access the executable code responsive to the request;
causing the local targeted script management component to store restoration information for the identified set of host computing devices enabling restoration of the identified set of host computing devices to a state prior to the execution of the determined executable code;
determining, by the local targeted script management component, whether at least one of the identified set of host computing devices is to be restored to a state prior to the execution of the determined executable code based on a state of the at least one of the identified set of host computing devices after execution of the determined executable code;
restoring, by the local targeted script management component, the at least one of the identified set of host computing devices to a prior state using the restoration information in response to determining that the at least one of the identified set of host computing devices is to be restored to the state prior to the execution of the determined executable code without receiving a command from a user to restore the at least one of the identified set of host computing devices;

obtaining information related to the execution of the executable code on the identified set of host computing devices and corresponding to whether the elicited actions occurred on the identified set of host computing devices, the elicited actions corresponding to a failure on the set of identified host computing devices, the obtained information comprising log information collected by the local targeted script management component during execution of the executable code;

processing the obtained information; and transmitting at least a portion of the processed information wherein the executable code is configured to elicit: a deletion of at least a percentage of data packets between the identified set of host computing devices and one or more network components, a modification of communication channels between the identified set of host computing devices and the one or more network components, and a reboot of the identified set of host computing devices and the one or more network components, and wherein the local targeted script management component is implemented by one or more computer processors.

9. The method as recited in claim 8, wherein the executable code is configured in accordance with the identified set of host computing devices.

10. The method as recited in claim 8, wherein the executable code is configured to elicit at least one of a simulation of specific actions on a host computing device, a simulation of actions on a communication network, and a simulation of actions associated with other network components.

11. The method as recited in claim 8, wherein obtaining information related to the execution of the executable code on the identified set of host computing devices includes obtaining information identifying errors generated on a host computing device.

12. The method as recited in claim 8, wherein obtaining information related to the execution of the executable code on the identified set of host computing devices includes obtaining information identifying a modification of data on a host computing device.

13. The method as recited in claim 8, wherein processing the obtained information includes filtering the obtained information.

14. The method as recited in claim 8, wherein the executable code corresponds to a targeted script, the targeted script configured for the identified set of host computing devices.

15. The method as recited in claim 8, wherein the executable code is configured to elicit the termination of an identified set of processes being executed on a host computing device.

16. The method as recited in claim 8, wherein the executable code is configured to elicit a delay in one or more processing resources associated with a host computing device.

17. The method as recited in claim 8, further comprising causing the execution of the executable code on the identified set of host computing devices.

18. The method as recited in claim 17, wherein the execution of the executable code on the identified set of host computing devices is controlled by the local targeted script management component.

19. The method as recited in claim 8, wherein the executable code is configured to elicit the consumption of computing device resources on a host computing device.

20. The method as recited in claim 19, wherein the computing device resources include at least one of central processing unit capacity, memory, network connectivity and storage.

21. A non-transitory computer readable medium having instructions stored thereon, which when executed on a computer system, perform a method for host computing devices, the method comprising:

obtaining an instruction for execution of executable code, the executable code configured to elicit actions on a host computing device enabling evaluation of an operation of the host computing device;

accessing the executable code from an executable code data store implemented in a non-volatile storage device;

storing restoration information for the host computing device enabling restoration of the host computing device to a state prior to the execution of the executable code;

causing execution of the executable code;

determining whether the host computing device is to be restored to a state prior to the execution of the executable code based on a state after execution of the executable code;

restoring the host computing device to a prior state using the restoration information in response to determining that the host computing device is to be restored to the state prior to the execution of the executable code without receiving a command from a user to restore the host computing device;

obtaining information related to the execution of the executable code, the information comprising log information collected during execution of the executable code; and transmitting at least a portion of the information related to the execution of the executable code, wherein the executable code is further configured to elicit: a deletion of at least a percentage of data packets between the host computing device and one or more network components, a modification of communication channels between the host computing device and the one or more network components, and a reboot of the host computing device and the one or more network components.

22. The non-transitory computer readable medium as recited in claim 21, wherein transmitting at least a portion of the information related to the execution of the executable code includes transmitting information to a management component.

23. The non-transitory computer readable medium as recited in claim 21, wherein the method further comprises processing the information related to the execution of the executable code.

24. The non-transitory computer readable medium as recited in claim 21, wherein the executable code is further configured to elicit the prevention of data packets between the host computing device and the one or more network components.

25. The non-transitory computer readable medium as recited in claim 21, wherein the executable code is further configured to elicit a delay in the processing of data packets between the host computing device and the one or more network components.

26. The non-transitory computer readable medium as recited in claim 21, wherein the method further comprises determining to stop the execution of the executable code.

27. The non-transitory computer readable medium as recited in claim 26, wherein determining to stop the execution of the executable code includes determining that a time period for execution of the executable code has expired.

28. The non-transitory computer readable medium as recited in claim 26, wherein determining to stop the execution of the executable code includes determining that at least one of an error and modification has been caused by the execution of the executable code.

29. The non-transitory computer readable medium as recited in claim 26, wherein said restoring further comprises initiating a restoration of the host computing device responsive to the stoppage of the execution and the determination that the host computing device is to be restored to the state prior to the execution of the executable code.

\* \* \* \* \*